United States Patent

Michaelis et al.

[11] Patent Number: 6,165,403
[45] Date of Patent: *Dec. 26, 2000

[54] METHOD FOR THE MANUFACTURE OF A FILTER CARTRIDGE

[75] Inventors: Udo Michaelis, Albach-Hähnlein; Jörgen Knudsen, Angelbachtal, both of Germany

[73] Assignee: Firma Carl Freudenberg, Weinheim, Germany

[ * ] Notice: This patent is subject to a terminal disclaimer.

[21] Appl. No.: 09/325,918

[22] Filed: Jun. 4, 1999

Related U.S. Application Data

[62] Division of application No. 09/138,156, Aug. 21, 1998, Pat. No. 6,045,600.

[30] Foreign Application Priority Data

Aug. 21, 1997 [DE] Germany ............................ 197 36 267

[51] Int. Cl.[7] .................................................. B29C 45/14
[52] U.S. Cl. .................. 264/261; 264/277; 264/DIG. 48; 425/129.1
[58] Field of Search ...................................... 264/261, 275, 264/DIG. 48, 263, 277; 425/129.1

[56] References Cited

U.S. PATENT DOCUMENTS

| 4,078,036 | 3/1978 | Keefer ....................................... 264/261 |
| 5,257,767 | 11/1993 | McConnell ........................... 248/284.1 |
| 5,997,793 | 12/1999 | Lahnala .................................. 264/261 |

FOREIGN PATENT DOCUMENTS

| 43 23 522 | 1/1995 | Germany . |
| 53-113371 | 10/1978 | Japan . |

*Primary Examiner*—Jan H. Silbaugh
*Assistant Examiner*—Edmund H. Lee
*Attorney, Agent, or Firm*—Kenyon & Kenyon

[57] ABSTRACT

A method for manufacturing a filter cartridge that has a filter medium, which, on the circumferential side, is surrounded with clearance by a gasket-seal. The method provides for a frame to be arranged in the gap formed by the clearance, and sealingly bonded to the edges of the filter medium and the gasket-seal.

1 Claim, 2 Drawing Sheets

METHOD FOR THE MANUFACTURE OF A FILTER CARTRIDGE

CROSS-REFERENCE TO RELATED APPLICATION

This application is a division of U.S. Ser. No. 09/138,156, filed Aug. 21, 1998, now U.S. Pat. No. 6,045,600.

BACKGROUND OF THE INVENTION

The invention relates to a filter cartridge and a method for its manufacture.

A filter cartridge is described in German Patent 43 23 522 A1. This German patent describes a filter cartridge that is made of a zigzag-shaped, pleated filter sheeting material, arranged in a plate shape, the filter sheeting material being disposed sealingly in a frame. The frame is constituted by a U-shaped strip made of synthetic non-woven fabric, which surrounds the pleated filter sheeting material along its longitudinal and transverse edges and is heat-sealed to it.

SUMMARY OF THE INVENTION

An object of this invention is a filter cartridge that is simple and cost-effective to manufacture and which has a durable and tight bond between the filter medium, the frame, and a seal running around the frame.

The filter cartridge includes a filter medium that is circumferentially surrounded along its periphery by a gasket seal offset from the filter with a clearance. A frame is arranged within the gap formed by the clearance. The frame is sealingly bonded to the filter medium edges and the gasket-seal edges, which face each other. The entire filter cartridge constitutes one unit, which can be pre-assembled, and is particularly simple to manufacture. The filter medium and the gasket-seal are inserted into the parting plane of a die and, to produce the frame, the edges, facing each other, are injection-molded all around with the frame material during the injection-molding process in the gap. As the frame material hardens, an indissoluble claw-type fixation of the frame to the edges automatically forms. According to the present invention, the bond between the filter medium, the frame, and the gasket-seal is achieved in only one operation. As the material of which the frame is made cools and solidifies, it at least partially penetrates and sealingly accommodates itself into the facing edges of the filter medium and gasket-seal.

The filter medium preferably is designed as an accordion fold pack. The use of a pleated accordion filter pack advantageously provides that the area of the filter surface is larger than the projected surface defined by the periphery of the filter medium.

The gasket-seal is manufactured separately from the filter medium, and preferably is designed to be ring-shaped i.e., closed upon itself. By avoiding a joint in the gasket-seal, the danger of leaks is reduced to a minimum. In addition, errors in assembly are largely prevented. Therefore, the insertion of the closed ring gasket-seal into the parting plane of the die is straight-forward.

The filter medium and the gasket-seal are preferably each made of non-woven fabric. The materials of the filter medium and the gasket-seal are selected so that they bond particularly well to the injected material of the frame. In the preferred embodiment, the entire filter cartridge is made up of a total of only two different materials, assuming that the filter medium and the gasket-seal are made of an identical non-woven fabric. This simple structure simplifies the disposal and/or reuse of filter cartridges that have lost their efficacy.

The frame preferably is made of a polymer material, the edges of both the filter medium and the seal being sealingly surrounded by the frame. As a result of the indissoluble, form-locking bond of the filter medium and gasket-seal edges to the frame, the filter cartridge of the present invention has very good working properties even under extreme conditions, for example, in very high or low temperatures. This structural approach helps prevent any undesirable detaching of the frame from the filter medium and/or from the gasket-seal.

BRIEF DESCRIPTION OF THE DRAWINGS

The filter cartridge according to the present invention, as well as the method for manufacturing it, are explained in greater detail below by reference to FIGS. 1 and 2.

DETAILED DESCRIPTION

Figure 1:
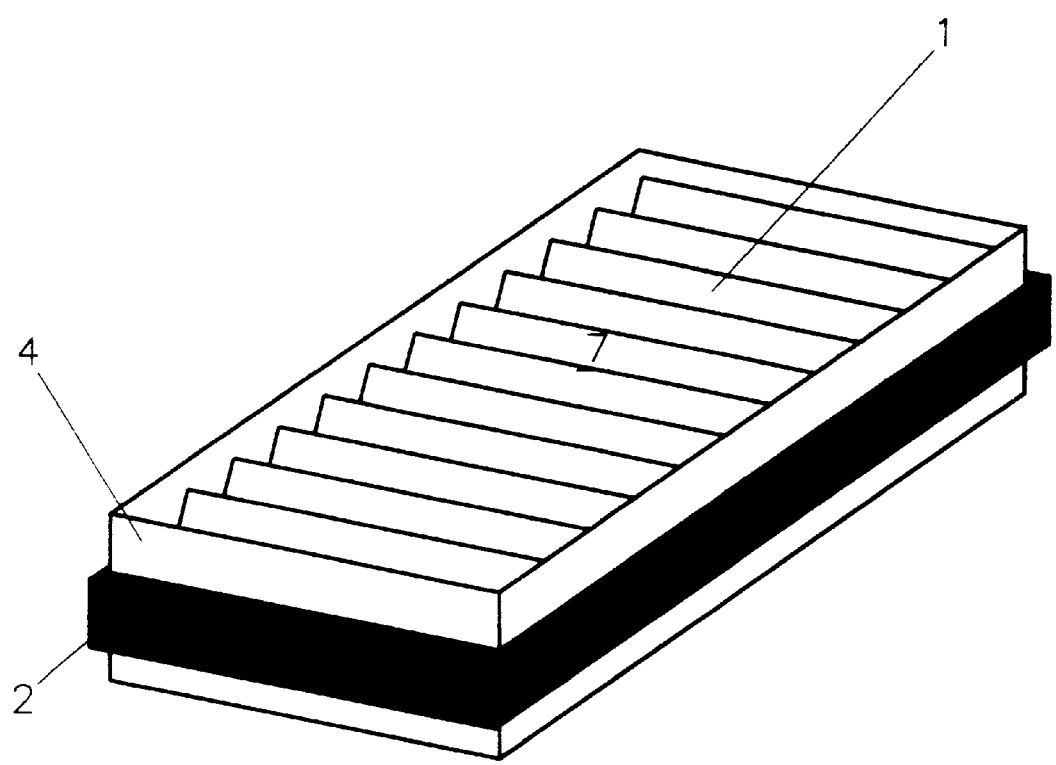
FIG. 1 is a perspective view of an embodiment of a filter cartridge constructed according to the principles of the invention.
Figure 2:
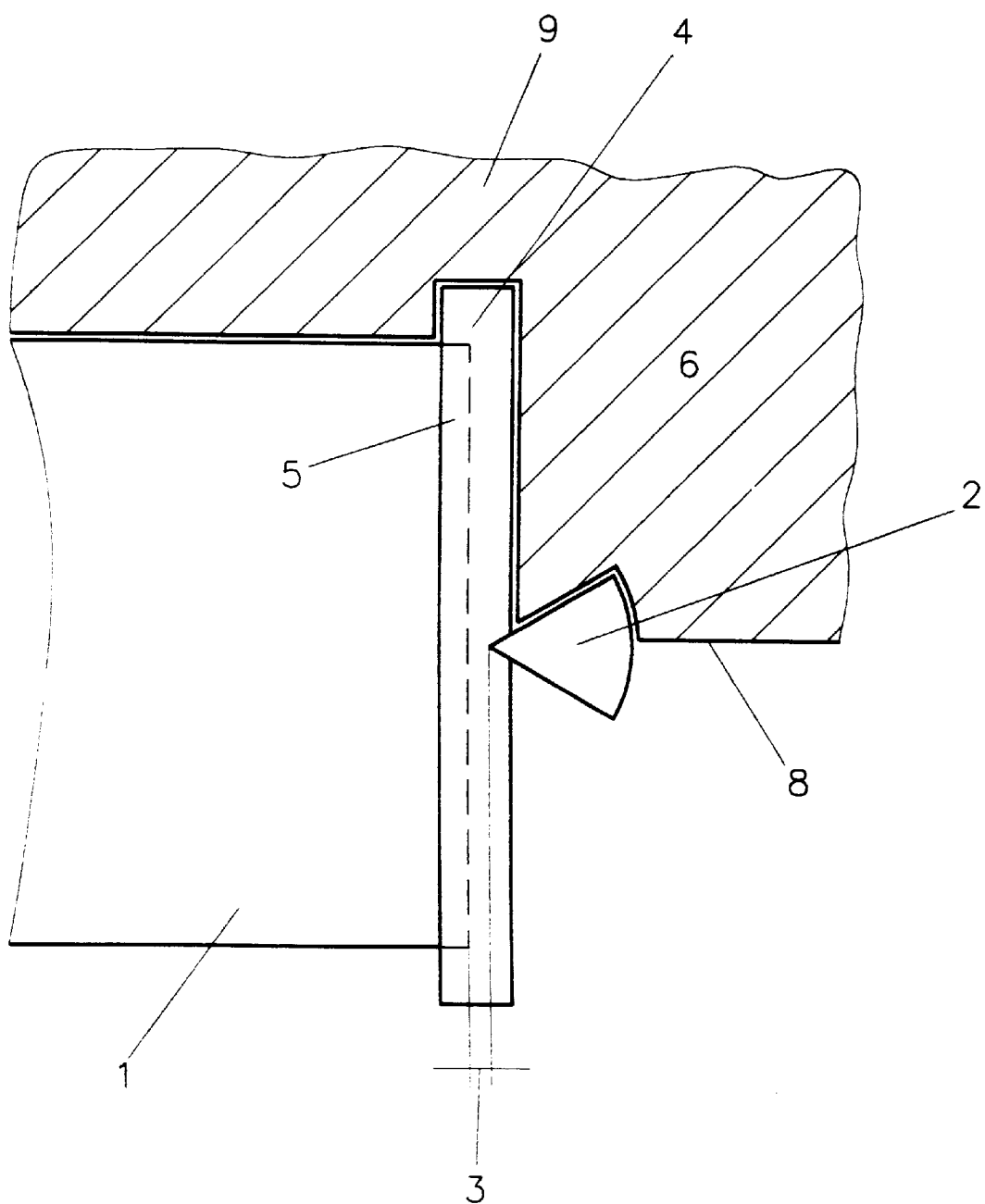
FIG. 2 illustrates the junction of the filter medium, the gasket seal, and the die used to form the frame.

An exemplary embodiment of a filter cartridge constructed according to the principles of the present invention is shown in FIGS. 1 and 2. To attain as large a filter surface area as possible, the filter medium 1 is designed as a pleated accordion fold pack 7. In use, it is arranged in a housing (not depicted here). Gasket-seal 2, which completely surrounds frame 4 along its outer periphery and can be sealingly installed in a housing under elastic prestressing, is designed to be ring-shaped, i.e. continuous. By avoiding joints, the danger of leaks is considerably reduced.

In contrast to filter medium 1 and gasket-seal 2, which in this exemplary embodiment are made of an identical non-woven fabric, frame 4 is made of a polymer material, which sealingly surrounds edges 5 and 6 of the filter medium 1 and the gasket-seal 2.

The manufacture of the filter cartridge is further illustrated in FIG. 2. Here, the filter medium 1 (here having the form of a pleated accordion fold pack) and gasket-seal 2 are inserted into the parting plane 8 of a die 9. After die 9 is closed, a liquefied polymer material is injected into gap 3, which is formed by the clearance between filter medium 1 and gasket-seal 2. Edges 5 and 6, facing each other, of filter medium 1 and gasket-seal 2 extend, in each case, into gap 3 and are sealingly enclosed by the still liquid, polymer material of frame 4. As the polymer material of frame 4 hardens, the hardening polymer material automatically bonds to the non-woven fabrics, forming an indissoluble sealing bond between frame 4 and edges 5 and 6.

Although the gasket-seal 2 shown in FIG. 2 is cone-shaped in cross section, it can have other shapes as well.

The dotted lines in FIG. 2 depict the boundary of edges 5 and 6 of filter medium 1 and gasket-seal 2, which are completely enclosed by the polymer material of frame 4.

This filter cartridge is particularly useful as an automobile passenger compartment filter for filtering the air entering the automobile passenger compartment coming from the ambient environment.

What is claimed is:

1. A method for manufacturing a filter cartridge, comprising the steps of:

inserting a filter medium having a circumferential perimeter defining edge and a gasket-seal having an edge into a die having a parting plane so that their edges extend towards the parting plane of the die with an offset gap defined by a clearance between the filter medium and the gasket seal, wherein the gasket seal circumferentially surrounds the filter medium so that the edges of both the gasket seal and the filter medium face each other;

injection molding a polymer into the gap to form a frame having a thickness that is greater than the clearance defined by the gap between the filter medium and the gasket seal, the polymer sealingly bonding to the facing edges of the filter medium and the gasket seal to form a unitary filter cartridge.

* * * * *